United States Patent
Babanezhad

(10) Patent No.: US 8,040,943 B1
(45) Date of Patent: Oct. 18, 2011

(54) LEAST MEAN SQUARE (LMS) ENGINE FOR MULTILEVEL SIGNAL

(75) Inventor: Joseph N. Babanezhad, Cupertino, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 919 days.

(21) Appl. No.: 11/724,817

(22) Filed: Mar. 15, 2007

(51) Int. Cl.
*H03H 7/30* (2006.01)

(52) U.S. Cl. ........ 375/229; 375/230; 375/231; 375/232; 375/233; 375/234; 333/18; 333/28 R

(58) Field of Classification Search .................. 375/264, 375/229–234; 333/18, 28 R
See application file for complete search history.

(56) References Cited

U.S. PATENT DOCUMENTS

| | | | |
|---|---|---|---|
| 4,074,086 A | 2/1978 | Falconer et al. | |
| 4,439,639 A | 3/1984 | Munter et al. | |
| 4,577,329 A * | 3/1986 | Brie et al. | 375/232 |
| 4,918,685 A | 4/1990 | Tol et al. | |
| 5,347,539 A | 9/1994 | Sridhar et al. | |
| 5,744,385 A | 4/1998 | Hojabri | |
| 5,880,634 A | 3/1999 | Babanezhad | |
| 5,936,445 A | 8/1999 | Babanezhad et al. | |
| 6,028,479 A | 2/2000 | Babanezhad | |
| 6,069,505 A | 5/2000 | Babanezhad | |
| 6,169,764 B1 | 1/2001 | Babanezhad | |
| 6,256,157 B1 | 7/2001 | Biskeborn et al. | |
| 6,266,367 B1 | 7/2001 | Strait | |
| 6,600,775 B2 | 7/2003 | Sutterlin et al. | |
| 6,778,599 B1 | 8/2004 | Doron | |
| 6,795,494 B1 * | 9/2004 | Phanse et al. | 375/219 |
| 6,909,742 B1 | 6/2005 | Leonosky | |
| 6,928,110 B2 | 8/2005 | Ougo et al. | |
| 6,985,549 B1 * | 1/2006 | Biracree et al. | 375/355 |
| 7,471,904 B2 | 12/2008 | Kaneda et al. | |
| 7,483,479 B2 | 1/2009 | Callicotte | |
| 7,561,619 B2 * | 7/2009 | Asuri et al. | 375/233 |
| 7,839,758 B1 | 11/2010 | Gregorian et al. | 370/201 |
| 7,843,859 B1 | 11/2010 | Gregorian et al. | 370/290 |
| 2003/0072363 A1 * | 4/2003 | McDonald et al. | 375/232 |

(Continued)

FOREIGN PATENT DOCUMENTS
EP 0 601 636 2/1989

(Continued)

OTHER PUBLICATIONS
John G. Proakis "Digital Communications" fourth edition 2000.*

(Continued)

*Primary Examiner* — Leon Flores
(74) *Attorney, Agent, or Firm* — Stattler-Suh PC

(57) ABSTRACT

A method and an apparatus for slicing a multilevel analog signal using a two-level slicer having one threshold level to generate an analog error signal. The method may be performed by delaying a received multilevel analog signal in a plurality of serial analog stages (n), further delaying a multilevel analog signal tapped from stage n, combining the further delayed signal from stage n with an analog error signal e(t) to provide an analog weighting function $W_n$, wherein the combining of the delayed signal from stage n with $W_n$ results in a plurality of signals $X_n W_n$, summing the plurality of signals $X_n W_n$, slicing a multilevel analog signal resulting from the summing of the plurality of signals $X_n W_n$ using one threshold level to generate the analog error signal e(t), and combining the delayed signal from stage n with $W_n$.

18 Claims, 12 Drawing Sheets

U.S. PATENT DOCUMENTS

| | | | |
|---|---|---|---|
| 2003/0235245 A1* | 12/2003 | Erdogan et al. | 375/232 |
| 2005/0019042 A1* | 1/2005 | Kaneda et al. | 398/208 |
| 2005/0094583 A1 | 5/2005 | Gupta et al. | |
| 2006/0262686 A1 | 11/2006 | Wu | |
| 2008/0080598 A1* | 4/2008 | Mo et al. | 375/219 |
| 2008/0224793 A1 | 9/2008 | Babanezhad | 375/229 |
| 2010/0142604 A1 | 6/2010 | Azenkot | 375/285 |

FOREIGN PATENT DOCUMENTS

| | | |
|---|---|---|
| WO | 2008/112328 | 9/2008 |

OTHER PUBLICATIONS

"IEEE 802 10GBASE-T Tutorial", (Nov. 2003), 1-56.

Widrow, B., et al., "Adaptive Antenna Systems", *Proceedings of the IEEE*, Vo. 55, No. 12, Dec. 1967, 2143-2159.

PCT, International Search Report and Written Opinion for PCT International Appln. No. US2008/003625, mailed Aug. 5, 2008 (17 pages).

PCT, International Preliminary Report on Patentability for PCT International Appln. No. US2008/003625, mailed Sep. 15, 2009 (9 pages).

Smolka, Georg J., "Alalog CMOS Circuits for ISDN", *ISCAS '88, Siemens AG, Components Group*, 8000 Munich, West Germany, (1988), 1927-1930.

USPTO Office Action dated Nov. 23, 2009, in the patent application entitled "Joint Phased Training of Equalizer and Echo Canceller", with U.S. Appl. No. 11/724,816, filed Mar. 15, 2007.

USPTO Office Action dated Jun. 14, 2010, in the patent application entitled "Joint Phased Training of Equalizer and Echo Canceller", with U.S. Appl. No. 11/724,816, filed Mar. 15, 2007.

USPTO Office Action dated Nov. 17, 2010, in the patent application entitled "Joint Phased Training of Equalizer and Echo Canceller", with U.S. Appl. No. 11/724,816, filed Mar. 15, 2007.

USPTO Office Action dated Apr. 1, 2010, in the patent application entitled "Analog Encoder Based Slicer", with U.S. Appl. No. 11/724,881, filed Mar. 15, 2007.

USPTO Office Action dated Nov. 3, 2010, in the patent application entitled "Analog Encoder Based Slicer", with U.S. Appl. No. 11/724,881, filed Mar. 15, 2007.

U.S. Appl. No. 12/406,025, filed Mar. 17, 2009, Method and Apparatus for Estimating Delay Difference Between Data Path and Error Path Using a Least Mean Square Unit, Gaurav Malhotra.

U.S. Appl. No. 11/724,881, filed Mar. 15, 2007, Analog Encoder Based Slicer, Joseph N. Babanezhad.

\* cited by examiner

US 8,040,943 B1

LEAST MEAN SQUARE (LMS) ENGINE FOR MULTILEVEL SIGNAL

RELATED APPLICATIONS

This application relates to commonly assigned U.S. patent application Ser. No. 11/724,881, entitled "Analog Encoder Based Slicer" filed on Mar. 15, 2007 by Joseph N. Babanezhad, U.S. patent application Ser. No. 11/724,816, entitled "Joint Phased Training of Equalizer and Echo Canceller" filed on Mar. 15, 2007 by Joseph N. Babanezhad, the disclosures of which are hereby expressly incorporated herein by reference.

FIELD OF THE INVENTION

The invention relates to the field of analog signal processing.

PRIOR ART AND RELATED ART

Digital signal processing is widely used to process data carrying signals to remove, for example, inter-symbol interference (ISI), echoes, cross talk and other impairments, and to provide filtering, correlation and other signal processing functions. Today, numerous analog signals are processed in the digital domain. Typically, after some analog filtering and amplification, the analog signal is converted to a digital signal for digital signal processing. The design of the analog-to-digital (A/D) converter can become critical, particularly, as baud rates increase. In fact, in some applications, the design of an A/D converter may be considered a limiting factor.

FIG. 1 illustrates a conventional arrangement for digital signal processing of a signal received over a twisted pair 14. The signal from the twisted pair is coupled to duplexing circuit 10. Duplexing circuit 10 has transmit leads 12, as well as a pair of receive leads connected to a low pass filter 16. By way of example, twisted pair 14 may be receiving a 800 Mb/sec two-pulse amplitude modulated symbol providing a baud rate of 800 MHz. Analog low pass filter 16 limits the frequency range to frequencies suitable for analog to digital converter (A/D converter) 18. Similarly, analog amplifier 17 provides an amplitude range generally falling within the range manageable by A/D converter 18. For the example described above, A/D converter 18 may have a sampling rate of 800 MHz and provide 10 or 11 effective number of bits (ENOB) of digital data to a digital signal processing section, which includes a feedback equalizer.

The digital signal processing section may include a feed forward equalizer (FFE) 19 to remove such impairments as precursor ISI caused by insertion loss. The output of equalizer 19 is summed with an output from feedback equalizer 27 for post cursor ISI. The outputs of echo and cross talk cancellers can also be summed at unit 26. The output of summation unit 26 is the digital output signal provided on line 20. An error signal, which is generated by slicer 21, is used by the digital signal processing section. The input and output of slicer 21 are subtracted from one another by subtractor 24 to provide the error signal on line 25. This error signal is coupled to both equalizers 19 and 27. The output of summation unit 26 is also input to slicer 21.

The signal-to-noise ratio for the arrangement of FIG. 1 is a function of the near end and far end alien crosstalk, line noise, uncancelled impairments that result from factors such as line insertion loss, return loss, crosstalk and the quantization noise introduced by A/D converter 18. For the most part, the quantization noise is further deteriorated due to clock jitter, which is a particularly troublesome at high frequencies such as the 800 MHz. As it turns out, A/D converter 18 is difficult to realize, if the quantization noise is to be kept low.

Conventional Phased Training of AEQ and AEC

A conventional transceiver that includes an equalizer (AEQ) and an echo canceller (AEC) is trained using conventional phased training. However, in the conventional phased training, the training of the AEC and the AEQ are performed sequentially in either the digital or analog domains.

In the digital domain, the AEQ and the AEC are trained separately in digital signal processing. In digital signal processing, when determining the proper tap weight, the proper tap weight is set or stored, and then after training both the AEQ and the AEC separately, they are run together in what is called "show-time" (also known as normal mode) using the stored tap weights. In other words, the AEQ is trained first, resulting in the tap weights for the equalizer being obtained and stored. Then, after the training of the AEQ has finished, the AEC is trained, resulting in the tap weights for the echo canceller being obtained and stored. This conventional training process requires a complex start-up process and complex timing, as described below with respect to phased training in the analog domain.

Training the AEQ and the AEC, in the analog domain, presents an issue that the tap weight can not be stored or set indefinitely, as done in phased training in the digital domain, but only temporarily for a short time. Thus, training must continue until the AEQ and the AEC are suitably trained.

Phased training the AEQ and the AEC in the analog domain, generally is performed by training the AEQ, storing the tap weights of the AEQ, and then subsequently training the AEC. The tap weights of the AEQ are stored digitally. Phased training in the analog domain requires a complex start-up process. The start-up process requires that while training the AEQ, the operations of the AEC be halted. Then when subsequently training the AEC, the operations of the AEQ are halted. This requires complex timing to halt and starting the operations of the AEC and AEQ.

Using this approach, the performance of both the AEC and AEQ depends on each other because phased training is based on a shared error signal. For example, the error signal that is used for the AEQ is also used for the AEC. For example, when the AEQ has not trained properly (e.g., shared error signal is large, such that the signal-to-noise ratio (SNR) is less than 10 dB), the subsequent training of the AEC will be impacted, and consequently, will not train properly as well. The large error signal may be the result of having an incorrect tap weight, and then by subsequently using that error signal, there may be too much echo, which consequently, yields unstable loops in the system. In conventional phased training, both the AEQ and AEC may each have a corresponding least mean square (LMS) machine. The LMS machines each look at an error signal, which is shared between the two LMS machines. The LMS machine of the AEQ receives an error signal that is generated from the output signal of a subtractor that is coupled to the output of the slicer. The subtractor receives the output signal of slicer and subtracts the output signal from AEQ. The input to LMS machine of the AEC is coupled to the output of same subtractor that is coupled to the output of the slicer.

Conventional Slicers

FIG. 6A is a block diagram showing a conventional slicer associated with a prior art digital signal processing system. Conventional slicer 80 includes A/D converter 81 and digital to analog converter (D/A converter) 82. There may be a decision block between A/D converter 81 and D/A converter 82 that may simply pass the output for A/D converter 81 unchanged to D/A converter 82 or may perform other functions. The signal y(t) received on line 84 by slicer 80 is input into A/D converter 81. A/D converter 81 outputs a digital signal to be received by D/A converter 82. D/A converter 82 converts the digital signal received by A/D converter 81 to an analog signal, provided as an output analog signal d(t) on line 85. The input signal y(t) received by A/D converter 81 on line 84 is subtracted from the output signal d(t) of D/A converter 82 on line 85 by subtractor 83 to provide an error signal e(t) on line 86.

It should be noted that although slicer 80 is illustrated as including A/D converter 81 and D/A converter 82 in the same component, A/D converter 81 and D/A converter 82 may reside on separate components. For example, A/D converter 81 may be A/D converter 18, as described with respect to FIG. 1, and D/A converter 82 may reside in a digital signal processing section, as described with respect to FIG. 1.

The conventional slicer introduces unwanted noise and unwanted spikes in the error signal. Because slicer 80 includes A/D converter 81, slicer 80 introduces quantization noise into the system, which affects the signal-to-noise ratio. As described above, the signal-to-noise ratio is a function of the near end and far end alien crosstalk, line noise, uncancelled impairments that result from factors such as line insertion loss, return loss, crosstalk and the quantization noise introduced by A/D converter 18. For the most part, the quantization noise is further deteriorated clock jitter introduced by the clocked A/D converter. The quantization noise is particularly troublesome at high frequencies such as the 800 MHz. Consequently, the LMS machine reacts adversely to the unwanted noise and spikes introduced by the conventional slicer.

FIG. 6B is a graph showing the magnitude of the input signal y(t) on line 84, output signal d(t) on line 85, and error signal e(t) on line 86 of the conventional slicer of FIG. 6A when A/D and D/A resolution is 1-bit with respect to time (i.e., when the slicer of FIG. 6A is a sign slicer). Slicer 80, based on A/D converter 81 and D/A converter 82, produces sharp edges at the output of D/A converter 82, as illustrated in output signal d(t) on line 85 of FIG. 6B. The sharp edges or infinitely sloped edges result from converting the analog signal to a digital signal and back to an analog signal using a clock. Subtracting the input signal y(t) on line 84 from the output signal d(t) on line 85 produces unwanted spikes in the error signal e(t) on line 86 at the output of subtractor 83 due to the sharp edges present in the output signal d(t) on line 85. Consequently, use of the error signal e(t) by an LMS machine causes the LMS machine to react adversely to the unwanted spikes. Ultimately, using slicer 80 results in noisy taps and degradation in the overall performance of the signal processing.

Conventional Multilevel Slicers

FIG. 8 illustrates a graph showing the magnitude of analog signals of a conventional multilevel slicer having five threshold levels. The multilevel slicer that produces the analog signal shown in FIG. 8 includes five threshold levels, 102-106. Analog signal y(t) 101 represents the input signal received by the multilevel slicer, and the analog signal d(t) 116 represents the output signal produced by the two-level slicer. As analog signal y(t) 101 crosses or is equal to one of the threshold levels, 102, 103, 104, 105, and 106, the slicer outputs an analog signal d(t) 116 at one of the output levels 107, 109, 111, 113, and 115, respectively.

For example, as analog signal y(t) 101 reaches threshold level 102, as illustrated in FIG. 8, the multilevel slicer outputs analog signal d(t) 116 at output level 107. As analog signal y(t) 101 then reaches threshold level 103, the multilevel slicer outputs analog signal d(t) 116 at output level 109, and has a transition spike 108. As analog signal y(t) 101 then reaches threshold level 104, the multilevel slicer outputs analog signal d(t) 116 at output level 111, and has a transition spike 110. As analog signal y(t) 101 then reaches threshold level 105, the multilevel slicer outputs analog signal d(t) 116 at output level 113, and has a transition spike 112. As analog signal y(t) 101 then reaches threshold level 106, the multilevel slicer outputs analog signal d(t) 116 at output level 115, and has a transition spike 114. Because the multilevel slicer does not know the final destination of the analog signal y(t) 101 (e.g., threshold level that the analog signal y(t) 101 ultimately reaches), the slicer only changes outputs values from one threshold level to the next threshold level, even though the final destination of the analog signal y(t) 101 is a different threshold level than the next threshold level. During blind equalization, the multilevel slicer does not have any training signal to know exactly what signal is being equalized, and consequently, incorrectly outputs analog signal d(t) 116 at multiple output levels before the analog signal d(t) 116 is output at its final destination, the correct output level. For example, when the analog signal y(t) 101 goes from threshold level 102 to threshold level 106, the multilevel slicer does not know the final destination of threshold level 106, and thus, incorrectly outputs analog signal d(t) 116 at the output levels 109, 111, and 113 before the analog signal d(t) 116 is output at the correct output level, output level 115.

This blind process of not knowing the final destination results in jagged edges, and increases the transition period between sampling periods. Increasing the transition period decreases the size of the sampling period (e.g., eye opening as discussed below), which is used to reconstruct the analog signal in the digital domain. The increased transition period and decreased sampling periods create narrower pulses in the error signal. The error signal is generated by subtracting the input of the slicer from the output of the slicer. Furthermore, the error signal has less energy because of the lower quantization levels used to generate d(t) 116. Since the error signal is also used in the LMS machines, the narrower pulses of the error signal may prevent the LMS machine from converging. This results in overall poor performance. It should also be noted that conventional multilevel slicers include complex circuitry to analyze the multilevel thresholds. In addition, conventional multilevel slicers do not work beyond 3 pulse amplitude modulations (PAM).

SUMMARY OF THE INVENTION

A method and an apparatus for slicing a multilevel analog signal are described. In one embodiment, the method for slicing the multilevel analog signal is performed by delaying a received multilevel analog signal in a plurality of serial analog stages (n), further delaying a multilevel analog signal tapped from stage n, combining the further delayed signal from stage n with an analog error signal e(t) to provide an analog weighting function $W_n$, wherein the combining of the delayed signal from stage n with $W_n$, results in a plurality of signals $X_n W_n$, summing the plurality of signals $X_n W_n$, slicing a multilevel analog signal resulting from the summing of the plurality of signals $X_n W_n$ using one threshold level to generate the analog error signal e(t), and combining the delayed signal from stage n with $W_n$.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and an apparatus for slicing a multilevel analog signal is described. In one embodiment, the method for slicing a multilevel analog signal is performed by delaying a received multilevel analog signal in a plurality of serial analog stages (n), further delaying a multilevel analog signal tapped from stage n, combining the further delayed signal from stage n with an analog error signal e(t) to provide an analog weighting function $W_n$, wherein the combining of the delayed signal from stage n with $W_n$ results in a plurality of signals $X_n W_n$, summing the plurality of signals $X_n W_n$, slicing a multilevel analog signal resulting from the summing of the plurality of signals $X_n W_n$ using one threshold level to generate the analog error signal e(t), and combining the delayed signal from stage n with $W_n$.

A circuit for slicing a multilevel analog signal using a two-level slicer for analog correlation of a signal (e.g., 2.5 GHz) in the analog domain is described. In one embodiment, the analog correlation circuit is used to remove impairments such as echoes, cross talk and intersymbol interference is described.

In the following description, numerous specific details are set forth, such as specific frequencies, in order to provide a thorough understanding of the present invention. It will be apparent to one skilled in the art, that the present invention may be practiced without these specific details. In other instances, well-known circuit elements, such as amplifiers and multipliers, are not described in detail in order to not unnecessarily obscure the present embodiments.

OVERVIEW

In one embodiment, joint training the equalizer and the echo canceller is performed by providing independent error signals to two LMS machines, one each corresponding to the equalizer and the echo canceller. In one embodiment, joint training does not involve complex start-up process and does not require special timing between the training of the equalizer and the training of the echo canceller. This allows the equalizer and the echo canceller to operate independent from one another, and allows for an independent reset of the equalizer (e.g., all taps but one set to zero) and the echo canceller (e.g., all taps set to zero). This may yield a stable loop in the analog domain, and ultimately, improve performance of the circuit. LMS machines perform least mean square algorithms, and are used in adaptive filters to find the filter coefficients or tap weights that relate to producing the least mean squares of the error signal (e.g., difference between the desired and the actual signal). Although, the embodiments herein are described as using LMS algorithms to determine the tap weights of the adaptive filters, alternatively, other algorithms known by those of ordinary skill in the art of ordinary skill in the art can be used.

Figure 1:
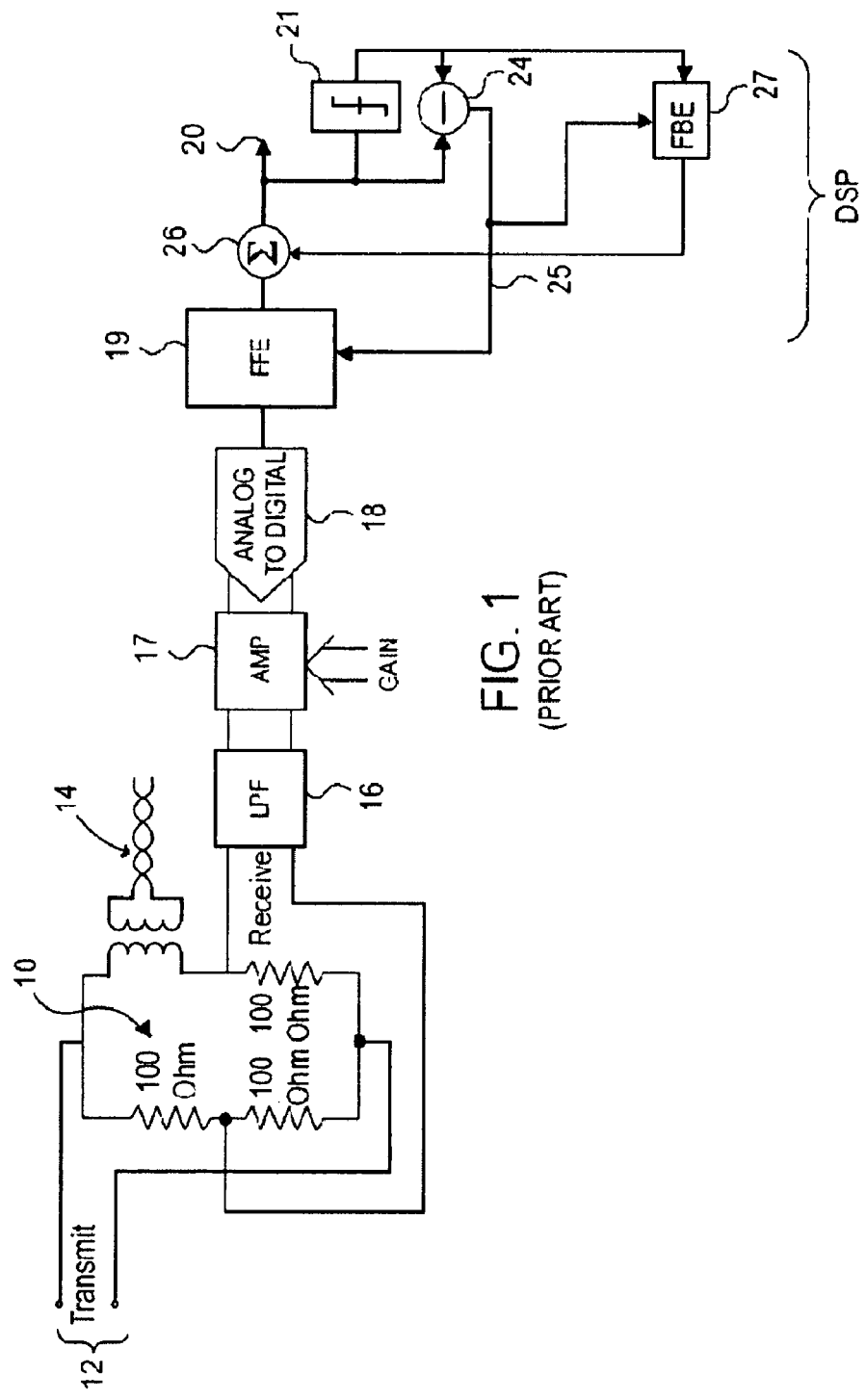
FIG. 1 illustrates a conventional arrangement for digital signal processing of a signal received over a twisted pair.

As will be described below, many of the signal impairments removed in the digital domain for the arrangement of FIG. 1 are removed in the analog domain as taught by the present invention. With the present invention, when the input signal is finally digitized, fewer bits are required and as a result, the A/D converter design is more manageable.

Figure 2:
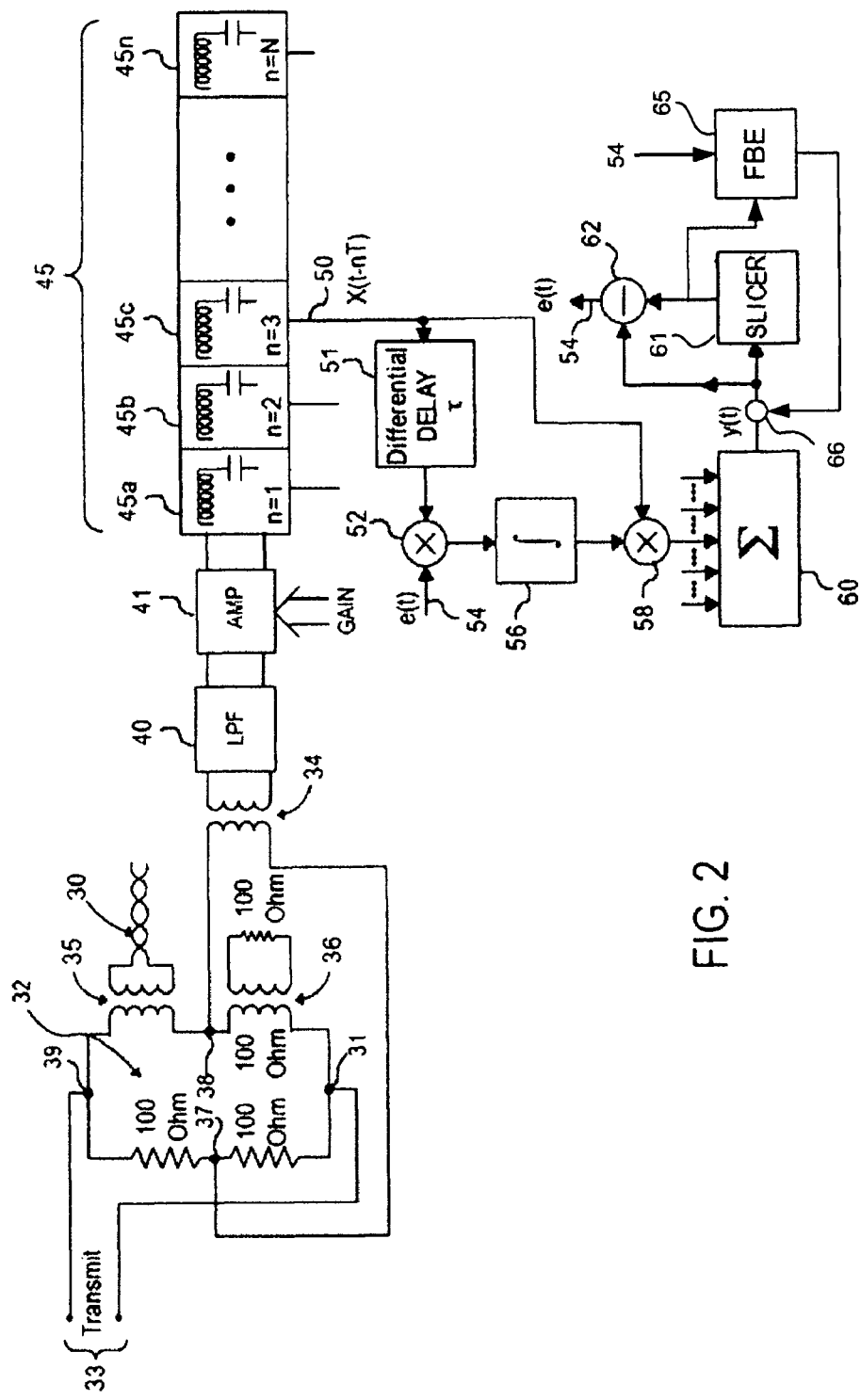
FIG. 2 illustrates a block diagram of one embodiment of the present invention.

FIG. 2 illustrates a block diagram of one embodiment of the present invention. Referring to FIG. 2, the input/output signals are received/transmitted over twisted pair 30, which is coupled through transformer 35 to duplexing circuit 32. The output signal to be transmitted to twisted pair 30 is coupled to circuit 32 through leads 33, which are common with nodes 31 and 39 of duplexing circuit 32. The input signal is received from twisted pair 30 at nodes 37 and 38. A resistor is coupled between nodes 39 and 37, and another resistor is coupled between nodes 31 and 37. The transformer 35 is coupled between the nodes 38 and 39. In one embodiment, these resisters are both 100 ohms. Another 100 ohm resistor may be coupled to the secondary winding of a transformer 36. The primary winding of this one-to-one transformer is coupled between the nodes 31 and 38 of the circuit 32. In one embodiment, the winding has a resistance of 100 ohms. Both transformers 35 and 36 are high frequency transformers, for instance in one embodiment, for coupling frequencies in the GHz range.

Figure 4:
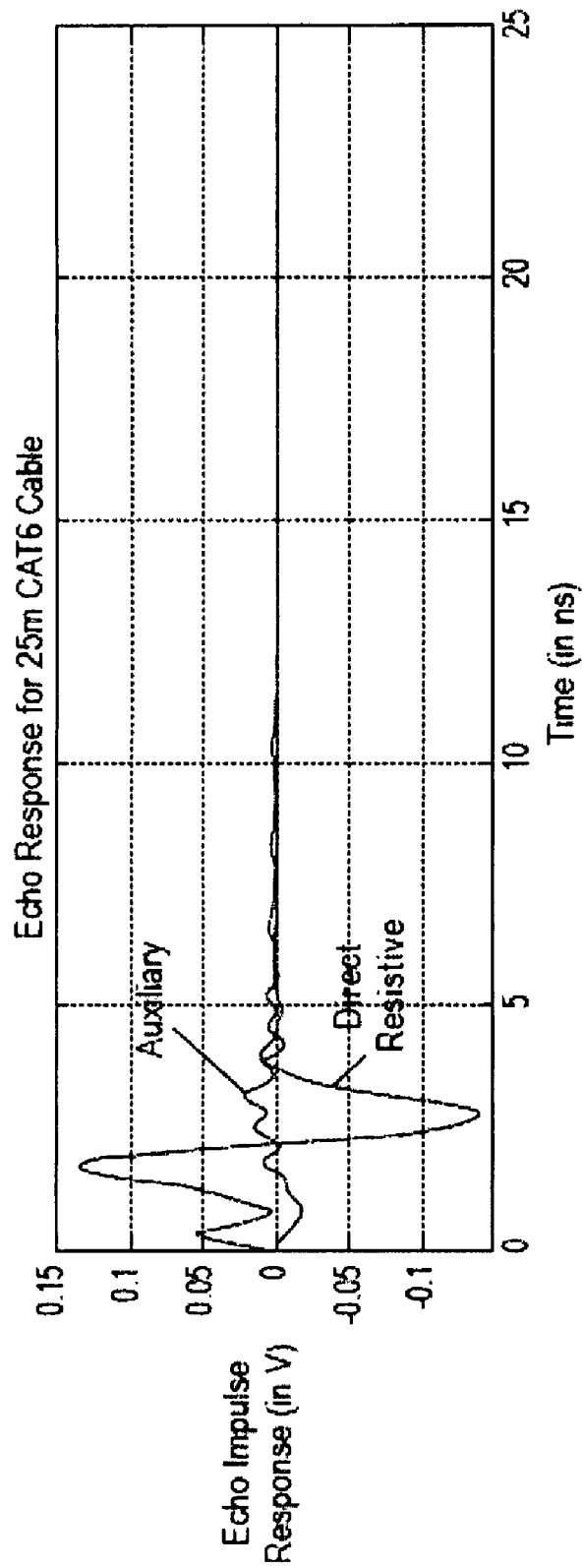
FIG. 4 illustrates a graph one embodiment of impulse responses comparing the performance of duplexing circuits shown in FIGS. 1 and 2.

Unlike the duplexing circuit of FIG. 1, duplexing circuit 32 of FIG. 2 includes transformer 36 for coupling to a resistor into the circuit. As discussed below, because of transformer 36, duplexing circuit 32 provides better echo response as illustrated in FIG. 4.

The input signal from duplexing circuit 32 is coupled to a low pass filter 40 through the high frequency transformer 34. This may be an ordinary analog low pass filter such as typically used to limit the high frequencies of a signal, which is subsequently digitized. Generally, frequencies higher than those that can be faithfully digitized are removed.

The output of filter 40 is coupled to an amplifier 41, which amplifies an input signal based on a gain control signal. Amplifier 41 may be an ordinary analog amplifier, such as used in digital signal processing section. Amplifier 41 typically controls the gain of the received signal so that the amplified signal falls within a predetermined region of the operating characteristics of the circuits receiving the amplified signal.

The output of amplifier 41 is coupled to an analog delay line 45. Delay line 45 has multiple stages such as stages 45a-45n, each of which, in one embodiment, provides equal periods of delay. In one embodiment, each stage has one or more segments, and each segment includes an inductor and a capacitor. This allows for a fractionally or symbol spaced equalizer. For the illustrated embodiment, each stage has a single inductor and a single capacitor. Ideally, delay line 45 is lossless; although as a practical matter, there is some loss associated with each of the stages. For purposes of discussion, each of the stages are consecutively numbered from n=1 to n=N.

In one embodiment, the entire delay line is fabricated from passive elements (inductors and capacitors) without amplification between stages. This reduces the noise that would otherwise occur and build up over the delay line. Ideally, the magnitude at each tap is constant with only the phase of the signal changing.

A signal at a tap from each stage of delay line 45 is coupled to two combining circuits. Specifically in FIG. 2, tap 50 from stage 45c (n=3) is coupled to a multiplier 52 through delay circuit 51, and is coupled directly to multiplier 58. Delay circuit 51 further delays the analog signal on tap 50. In one embodiment, delay circuit 51 is an LC circuit. The purpose of delay circuit 51 is to maintain loop stability as discussed below.

Multiplier 52 multiplies the output of delay circuit 51 by an error signal e(t) on line 54. The resultant analog signal from multiplier 52 is coupled to an integrator 56. Integrator 56, which may be an ordinary capacitance integrator, performs integration on the analog signal from multiplier 52. In one embodiment, integrator 56 has a time constant measured in microseconds for a received signal in the GHz range. Thus, this integration is relatively long with respect to the period of the received signal. The output of integrator 56 is coupled as one input to multiplier 58, which multiplies it by the signal from tap 50.

There is a delay circuit, two combining circuit, and an integrator for each of the taps of delay line 45. The outputs from the second combining circuits, such as multiplier 58, are all combined in summation unit 60. As discussed below, the output of the summation unit provides the analog output signal, y(t), which is the input signal X(t), which is shown in FIG. 2, after it has been processed to remove impairments.

The analog error signal on line 54 is generated by slicing the signal y(t) in slicer 61 and then subtracting the resultant signal from the input to slicer 61 in subtractor 62. This results in an error signal, which is used, as described below, to develop the adaptive tap weights forming one input to the second combining circuit (e.g., multiplier 58).

The embodiment of FIG. 2 also includes a feedback equalizer (FBE) 65, which performs a similar function to the FBE 27 of FIG. 1. The FBE 65 receives the output of slicer 61, the signal e(t) on line 54 and provides an output to summer 66. FBE 65 may be fabricated with the same technology shown for the FFE in FIG. 2.

In one embodiment, the circuitry of FIG. 2, except for duplexing circuit 32, is realized as an integrated circuit using, for instance, conventional CMOS technology. Alternatively, the integrated circuit may include circuitry other than that shown on FIG. 2. In one embodiment, the output from summation unit 60 is coupled to an A/D converter, and converted into a digital signal for further processing. Unlike the prior art, however, the A/D converter typically only requires an ENOB of 7 bits for subsequent processing. This is in contrast to ENOB of 10 or 11 bits required in the prior art, as shown in FIG. 1, for processing of the same input signal.

The circuitry of FIG. 2 provides a finite impulse response through the correlation that occurs between the weighting functions and the input signal. In one embodiment, the operation of summation unit 60 is represented by the following equation:

$$Y(t)=\Sigma W_n \cdot X[t-(n-1)T]$$

where y(t) is the signal at the output of summation unit 60, $W_n$ is the adaptive tap weight associated with tap n, and X(t−nT) is an output at a tap for a stage n, the input function at the taps for each stage n, where T is equal to the time delay of each of the stages. This equation can be expanded as follows:

$$Y(t)=W_0X(t)+W_1X(t-T)+W_2X(t-2T)+\ldots W_NX(t-NT)$$

where N+1 is the total number of stages in the delay line. Each term in this equation has a value represented by the output of the second combining means such as multiplier 58. The terms are then summed within summation unit 60 to generate y(t).

The tap weights for the embodiment of FIG. 2 may be written as:

$$W_n = \frac{1}{A}\int e(t)x(t-nT-\tau)dt$$

where $$\frac{1}{A}$$

is a constant, e(t) is the error signal on line 54, and τ is the delay provided by the differential delay circuit 51. The integration shown in the above equation is performed by integrator 56.

As may be noted from FIG. 2, the signal from tap 50 is fed back to multiplier 52 through the loop comprising integrator 56, multiplier 58, summation unit 60, slicer 61, and then to multiplier 52 (via an error signal). If the delay in this feedback loop is too long, instability can occur since the feedback may cause the signal at the output of integrator 56 to continually rise or fall. Differential delay circuit 51 is used to stabilize the circuitry. Ideally, the delay τ should be equal to the loop delay or, in practice, slightly more than the loop delay. Moreover, the delay from differential delay circuit 51 may be made programmable. The delay, in this embodiment, may be adjusted once the circuit is fabricated to optimize the delay. L-C elements can be selected as needed using anyone of a number of devices, such as EEPROM cells, antifuses, or a bonding option to provide this programmability.

In digital signal processing, this loop stabilizing delay is not required. In the digital domain, a value representing an error signal, for instance, can be readily stored and then used as feedback to integrator 56 under the control of a timing signal, and thus, the feedback problem described above does not occur.

Figure 3:
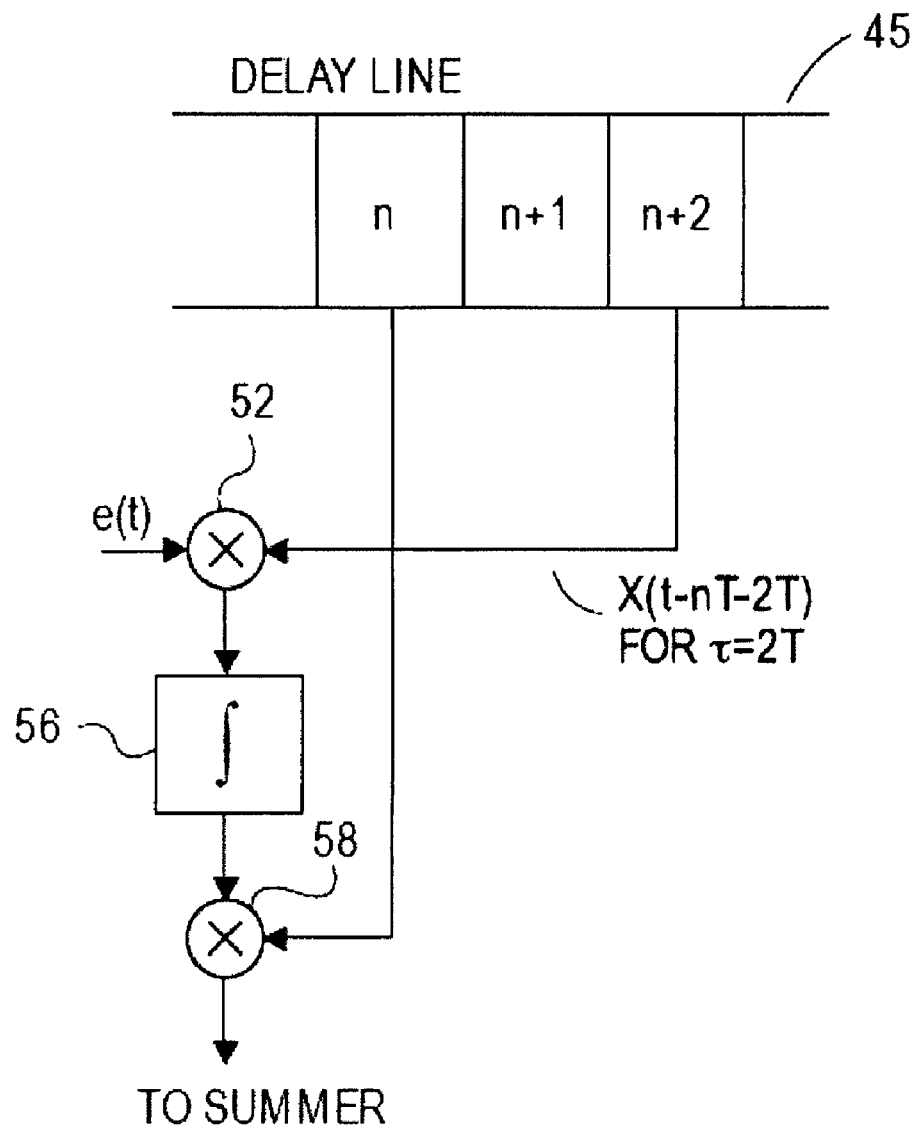
FIG. 3 illustrates a block diagram of an alternate method and apparatus for obtaining a delayed signal used for developing the adaptive tap weights also referred to below as the weighting functions.

An alternate embodiment is shown in FIG. 3. FIG. 3 illustrates a block diagram of an alternate method and apparatus for obtaining a delayed signal used for developing the adaptive tap weights also referred to below as the weighting functions. Again, delay line 45 includes taps for multiple stages, three of which are shown as n, n+1, and n+2. Multipliers 52 and 58, along with integrator 56 as illustrated in FIG. 2, are also present in FIG. 3. The error signal is also illustrated coupled to an input of multiplier 52 and the tap from the stage n is coupled as one input to multiplier 58. In the embodiment, the differential delay circuit 51 of FIG. 2 is not used. Rather, the delay from delay line 45 is used to provide the delay $\tau$, discussed above.

If $\tau$ is equal to 2T, then the signal at the tap of stage n+2 provides the same delay as differential delay circuit 51 of FIG. 2. To obtain a more precise delay, a portion of the delay may be obtained from a tap on delay line 45 and additional delay may be obtained from a separate delay circuit such as differential delay circuit 51 of FIG. 2. In this event, the delay circuit provides a delay less than T. If $\tau$ equaled 1.5T, a tap from a segment of a stage may be used with an additional delay provided by a separate delay circuit. For this reason, in one embodiment, multiplier 52 is coupled to receive a signal from one of the stages n+a of the delay line 45 to provide the tap weight $W_n$, where a is a positive integer.

Performance of the Duplexing Circuit

The performance of the duplexing circuits of FIGS. 1 and 2 are compared in the graph of FIG. 4 for an echo response. FIG. 4 illustrates a graph one embodiment of impulse responses comparing the performance of duplexing circuits shown in FIGS. 1 and 2. In particular, an echo response in 25 meters of a CAT 6 cable is shown where the amplitude of the response is plotted against time. The performance of the circuit 10 of FIG. 1 is illustrated by the waveform label "direct resistive" since all the resistors in this duplexing circuit are directly connected into the circuit. In contrast, in duplexing circuit 32 of FIG. 2, one of the resistors is coupled through the transformer 36. This is shown by the waveform "auxiliary" in FIG. 4. As shown, the amplitude of the response for the circuit of FIG. 1 is substantially larger than the amplitude for the circuit of FIG. 2. Overall, the performance for the duplexing circuit of FIG. 2 is better even though the circuit of FIG. 2 has some "ringing" which continues to occur later in time. This "ringing" can be more easily dealt with than the large amplitude associated with the circuit 10 of FIG. 1.

Joint Training of Equalizer and Echo Canceller

Figure 5:
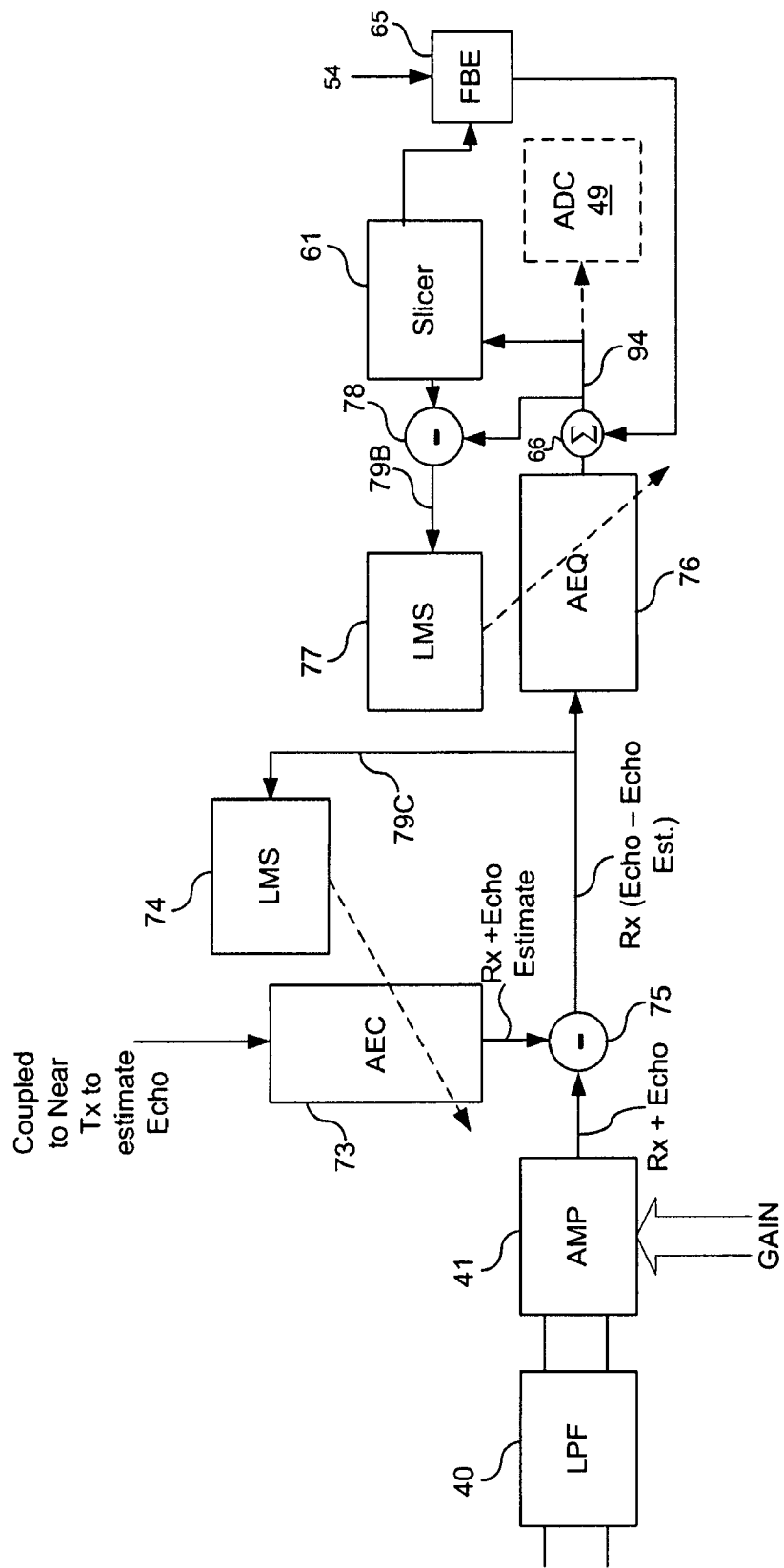
FIG. 5 illustrates a block diagram of one embodiment of a transceiver that performs analog joint training of an adaptive equalizer and adaptive echo canceller in the analog domain.
Figure 6A:
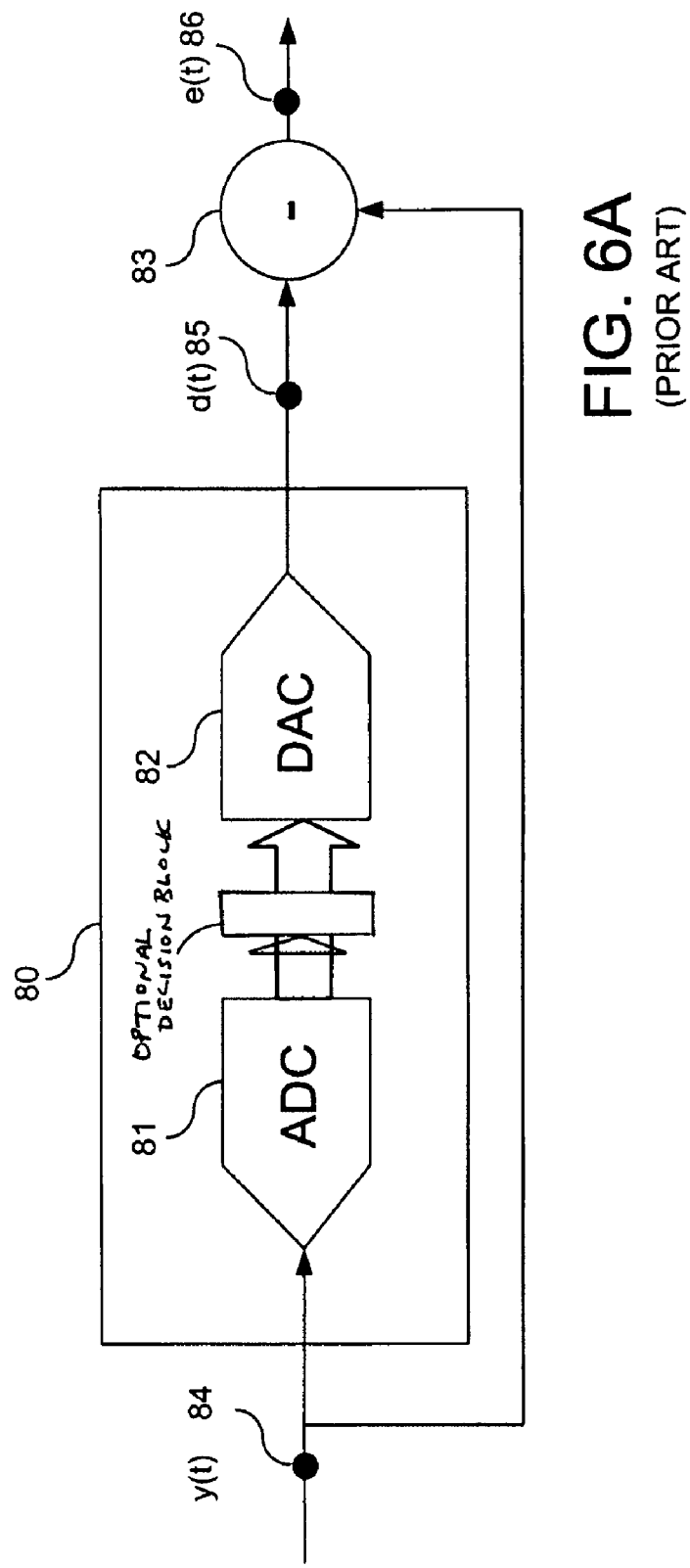
FIG. 6A illustrates a block diagram showing a conventional slicer associated with a prior art digital signal processing system.
Figure 6B:
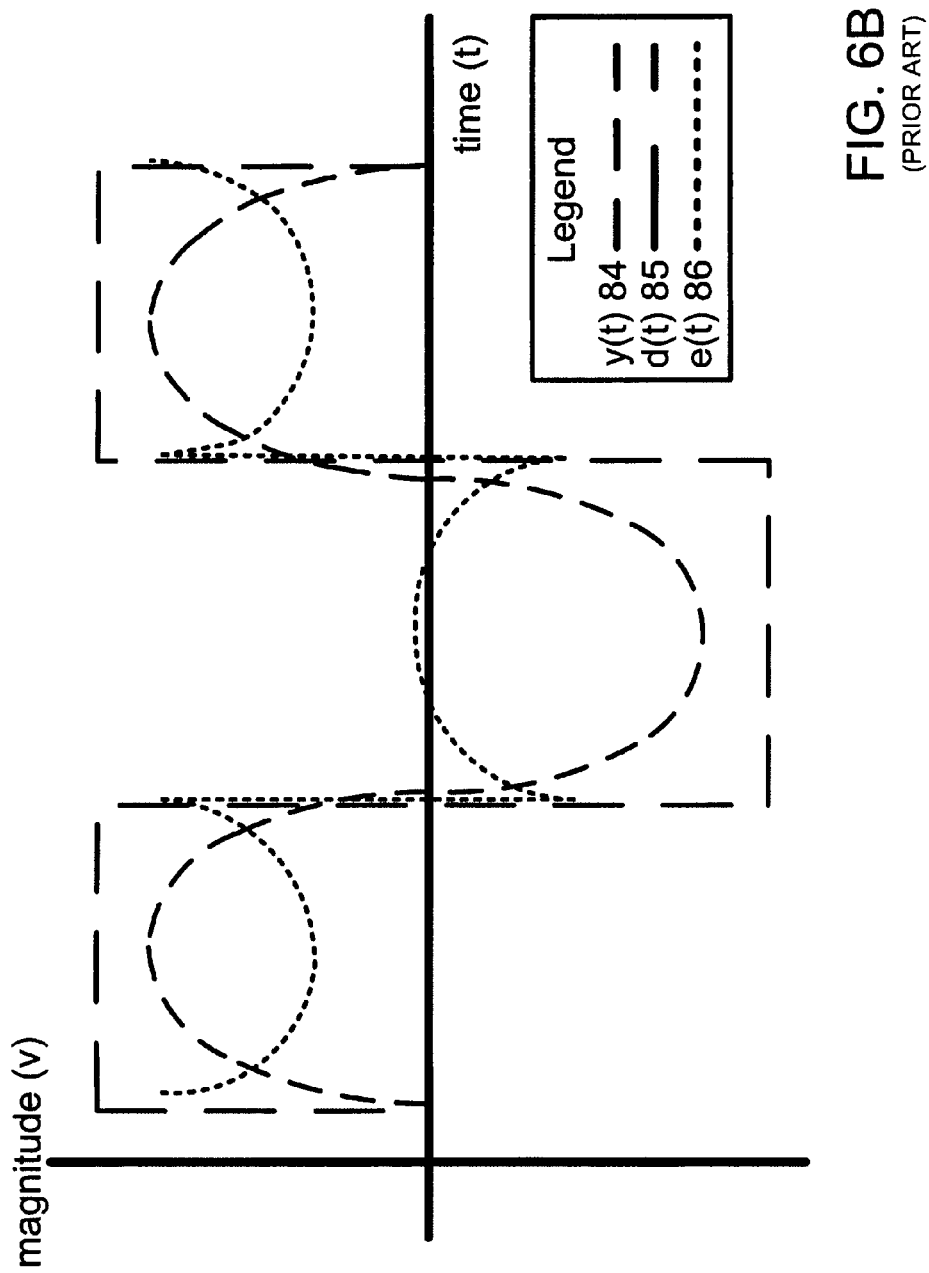
FIG. 6B illustrates a graph showing the magnitude of the input, output, and error signals of the conventional slicer of FIG. 6A with respect to time.

FIG. 5 illustrates a block diagram of one embodiment of a transceiver that performs analog joint training of an analog equalizer and analog echo canceller in the analog domain. In joint training in the analog domain, both AEQ 76 and AEC 73 have a corresponding least mean square (LMS) machine, LMS machines 77 and 74, respectively, each of which is responsive to an error signal. Unlike in conventional phased training, the error signal is not shared between the two LMS machines 77 and 74. LMS machine 77 receives an error signal 79B that is the output of subtractor 78, which subtracts the output signal of AEQ 76 from the output of slicer 61. The input to LMS machine 74 receives an error signal 79C that is the output of subtractor 75, which subtracts the output signal of AEC 73 and amplifier 41.

Unlike conventional phased training, joint training does not require a complex start-up process. Because joint training does not require complex start-up process, no complex timing is necessary during joint training. Furthermore, the performance of AEQ 76 is independent from the performance of AEC 73 because both AEQ 76 and AEC 73 receive independent error signals 79B and 79C, respectively. In one embodiment, when AEQ 76 has not trained properly, meaning error signal 79B is large (e.g., error signal 79B is large, such that the signal-to-noise ratio (SNR) is less than 10 dB), the error signal 79B may not affect error signal 79C because the training of AEC 73 is performed independently of the training of AEQ, and with an independent error signal 79C. In another embodiment, when AEC 73 has not trained properly, indicated by error signal 79C being large, error signal 79C does not affect error signal 79B because the training of AEQ 76 is performed independently of the training of AEC 73, and with an independent error signal. As described above, having a large error signal, for either error signal 79B or 79C, may be the result of having an incorrect tap weight. In addition, the tap weights may be incorrect if the loop becomes unstable.

In one embodiment, the output signals of AEQ 76 and AEC 73 are orthogonal with respect to each other. In one embodiment, in order to have the output signals of AEQ 76 and AEC 73 be orthogonal to each other, time constant of the integrator 56 needs to be large to slow down the circuit. The time constant should be larger than the loop delay, such as one or more orders of magnitude larger of than the loop delay. As described above, if this feedback has a long delay, instability can occur since the feedback may cause the signal at the output of integrator 56 to continually rise or fall. Having a large time constant may also reduce the power consumed by the circuit.

It should be noted that joint training permits AEQ 76 and AEC 73 to be reset independent of one another. When the AEQ 76 and AEC 73 are reset, the tap weights of the AEQ 76 and AEC 73 are set to an initial condition, where the tap weights may ultimately diverge to the desired solution. Also, because the far-end transmitter is orthogonal with respect to the near-end transmitter, the AEC 73 correlates the near-end transmitter to the near-end echo to remove the echo from received signal. The existence of the estimated echo signal does not affect the equalization because the AEC 73 is set to correlate the near transmitter to the near-end echo, and is not correlated to the received signal received by the AEQ 76. The time constant of the integrator of the AEC 73 needs to be large, as described above, in order to not affect the received signal (e.g., not integrating the received signal). The echo can be effectively removed from the received signal without affecting the equalization of the received signal.

In one embodiment, the method of joint training is performed by training the AEQ 76 using analog error signal 79B and LMS machine 77, and training AEC 73 using analog error signal 79C and LMS machine 74. The training of AEQ 76 and AEC 73 is performed jointly. It should be noted that the analog error signal 79B of the LMS machine 77 and the analog error signal 79C of the LMS machine 74 are independent of each other.

In one embodiment, error signal 79B may be obtained by slicing an output signal of AEQ 76 to generate a sliced signal, and subtracting the sliced signal of AEQ 76 and the output signal of AEQ 76 to generate the analog error signal 79B of the LMS machine 77. This process is known as blind training.

In another embodiment, error signal 79C may be obtained by receiving an input signal from either duplexing circuit 10 of FIG. 1 or duplexing circuit 32 of FIG. 2, filtering the input signal to limit high frequencies, amplifying the input signal so that an amplified signal falls within a predetermined region of operating characteristics of subsequent circuits receiving the amplified signal, and subtracting an output signal of AEC 73 to the amplified signal to provide the analog error signal of the LMS machine.

It should be noted that the output signal of AEQ 76 is coupled to the input of slicer 61, as well as the input of an A/D converter 49. Furthermore, A/D converter 49 may be coupled to a digital signal processing unit.

Training of AEQ 76 (or AEC 73) includes determining and adjusting the tap weights of a delay line, as described above with respect to FIGS. 2 and 3.

Analog Encoder Based Slicer

Figure 7A:
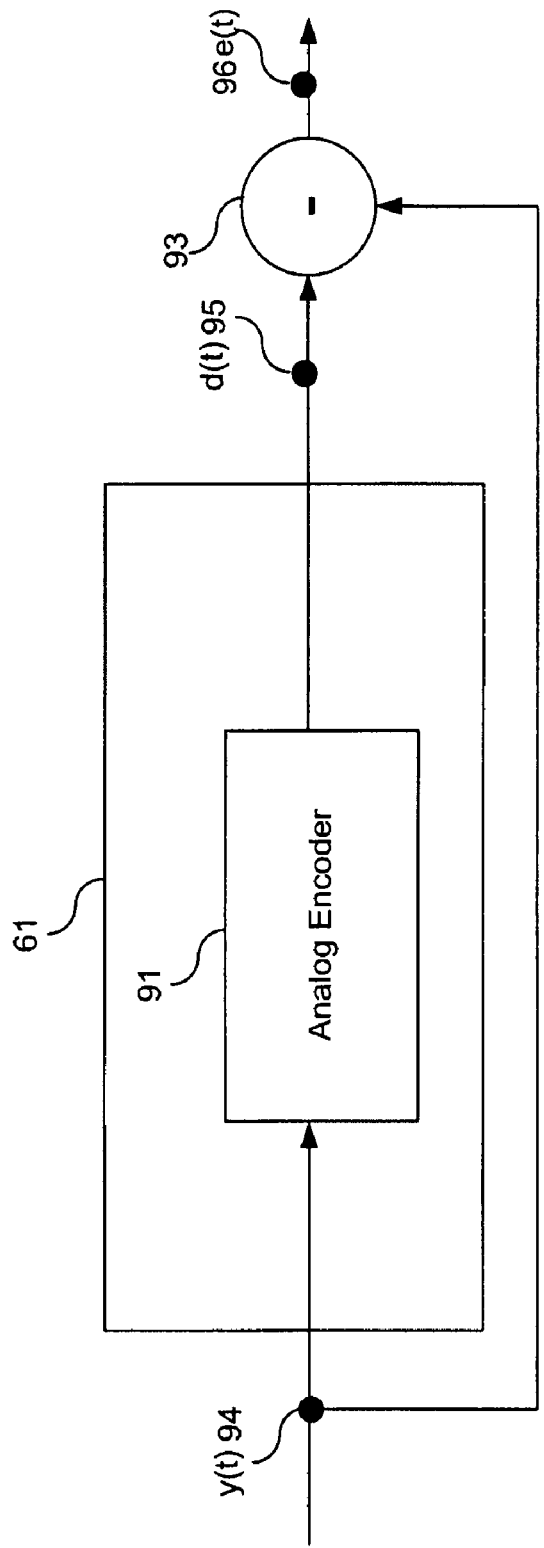
FIG. 7A illustrates a block diagram of one embodiment of an analog-encoder based slicer.

FIG. 7A illustrates a block diagram of one embodiment of an analog-encoder based slicer. As described above, the analog error signal on line 54 is generated by slicing the signal y(t) in slicer 61 and then subtracting from the resultant signal the input to slicer 61 using subtractor 62. This results in an error signal, which is used, as described above, to develop the adaptive tap weights. In one embodiment, slicer 61 has an analog encoder 91. The output of analog encoder 91 of slicer 61 is coupled to an output of subtractor 93. The signal y(t) received on line 94 by slicer 61 is input into analog encoder 91. Analog encoder 91 encodes the analog signal to generate an output analog signal d(t) on line 95. The input signal y(t) received by analog encoder 91 on line 94 is subtracted from output signal d(t) of analog encoder 91 on line 95 by subtractor 93 to generate an error signal e(t) on line 96.

In one embodiment, the method of slicing an analog signal is performed by slicing an analog input signal y(t) on line 94 in the analog domain to generate an encoded analog signal d(t) on line 95, and subtracting the analog input signal y(t) on line 94 from the encoded analog signal d(t) on line 95 to provide an analog error signal e(t) on line 96. Thus, the analog signal y(t) on line 94 can be sliced using an analog encoder 91 and subtracted using subtractor 93 from the encoded analog signal d(t) on line 95 to generate the analog error signal e(t) on line 96.

Because the analog signal is sliced in the analog domain, slicer 61 is placed in parallel to A/D converter 49. For example, the analog signal y(t) that is input into slicer 61 on line 94 is also input into A/D converter 49. This permits slicer 61 to operate without a clock signal, reducing the quantization noise introduced by clock jitter, as well as other digital conversion noise. Thus, slicer 61 uses an analog signal with a higher signal-to-noise ratio to generate the error signal e(t) on line 96 to be used as feedback for the LMS machines.

Thus, improved front end processing has been described for a data carrying signal received over a twisted pair. Many of the impairments often removed with a digital signal processing in the prior art are removed in the analog domain. This, as mentioned herein, significantly reduces the performance required of the A/D converter, and thereby provides a more readily realizable and better performing circuit.

Figure 7B:
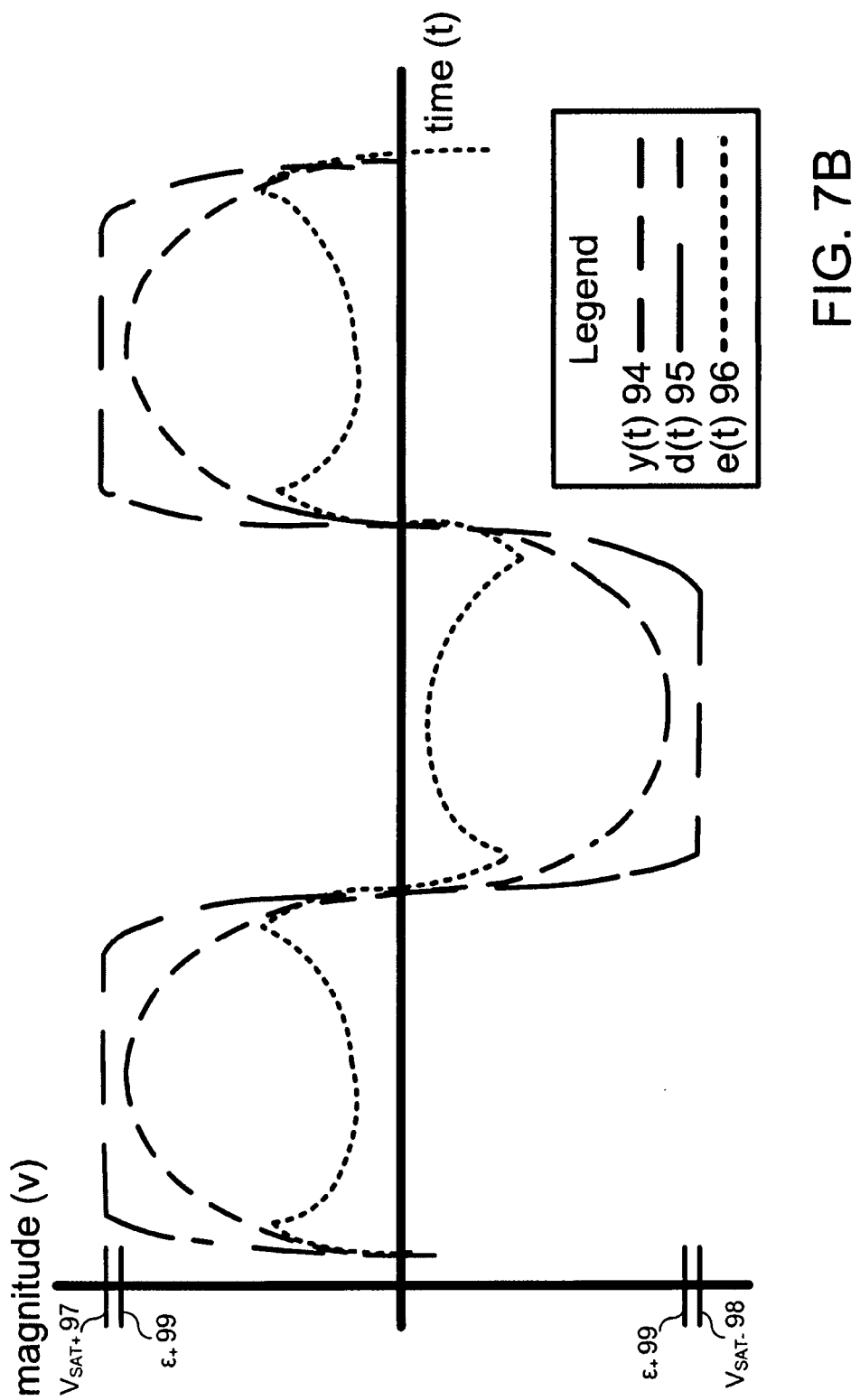
FIG. 7B illustrates a graph showing the magnitude of the input, output, and error signals of the analog-encoder based slicer of FIG. 7A with respect to time.

FIG. 7B illustrates a graph showing the magnitude of the input, output, and error signals of the analog-encoder based slicer of FIG. 7A with respect to time. In one embodiment, the encoded analog signal d(t) on line 95 has a characteristic of a finite slope when the analog signal y(t) on line 94 is between an upper threshold value, $\epsilon+$ 99, and a lower threshold value, $\epsilon-$ 100.

In one embodiment, in generating the encoded analog signal d(t), the analog encoder 91 saturates the encoded analog signal d(t) on line 95 at an upper saturation value (e.g., $V_{SAT+}$ 97) when the analog signal y(t) on line 94 is above an upper threshold value (e.g., $\epsilon+$ 99). The analog encoder 91 also saturates the encoded analog signal d(t) at a lower saturation value (e.g., $V_{SAT-}$ 98) when the analog signal y(t) on line 94 is below a lower threshold value (e.g., $\epsilon-$ 100). In one embodiment, analog encoder 91 generates the encoded analog signal d(t) on line 95 having a characteristic of a finite slope when the analog signal y(t) on line 94 is between the upper and lower threshold values, $\epsilon+$ 99 and $\epsilon-$ 100, respectively.

In one embodiment, the upper saturation value (e.g., $V_{SAT+}$ 97) is greater than the upper threshold value (e.g., $\epsilon+$ 99) and the lower saturation value (e.g., $V_{SAT-}$ 98) is less than the lower threshold value (e.g., $\epsilon-$ 100). Alternatively, the upper saturation value (e.g., $V_{SAT+}$ 97) is equal to the upper threshold value (e.g., $\epsilon+$ 99) and the lower saturation value (e.g., $V_{SAT-}$ 98) is equal to the lower threshold value (e.g., $\epsilon-$ 100).

In one embodiment, analog encoder 91 may be a comparator that compares the analog signal y(t) (e.g., on line 94) to a predetermined set values, namely upper and lower threshold values, $\epsilon+$ 99 and $\epsilon-$ 100, respectively, to generate, the encoded analog signal d(t) (e.g., on line 95). As described above, subtractor 93, which is coupled to the output of the comparator (analog encoder 91) and the input of the comparator, subtracts the analog signal y(t) (e.g., on line 94) from the encoded analog signal d(t) (e.g., on line 95) to produce the analog error signal e(t) (e.g., on line 96).

The analog error signal e(t) on line 96 may be used as a feedback error signal for the LMS machine. In one embodiment, the analog error signal e(t) on line 96 is analog error signal 79B received by LMS machine 77, which is used in joint training of AEQ 76, as described with respect to FIG. 5.

FIG. 7B illustrates a graph showing the magnitude of the input y(t) on line 94, output signal d(t) on line 95, and error signal e(t) on line 96 of the analog-encoder based slicer 61 of FIG. 7A with respect to time. Unlike the conventional slicer, slicer 61, based on analog encoder 91, does not produce sharp edges at the output, as illustrated in output signal d(t) on line 95. Because output signal d(t) on line 95 does not have the sharp edges, resulting from converting the analog signal to and from the digital domain, the output signal d(t) has smoother transitions. Subtracting the input signal y(t) on line 94 from the output signal d(t) on line 95 produces smoother transitions in the error signal e(t) on line 96 at the output of subtractor 93. Consequently, the use of the error signal e(t) by an LMS machine does not causes the LMS machine to react adversely. Ultimately, using slicer 61 reduces the noise present in the taps, and improves the overall performance of the signal processing in the analog domain.

Two-Level Slicer

Figure 9:
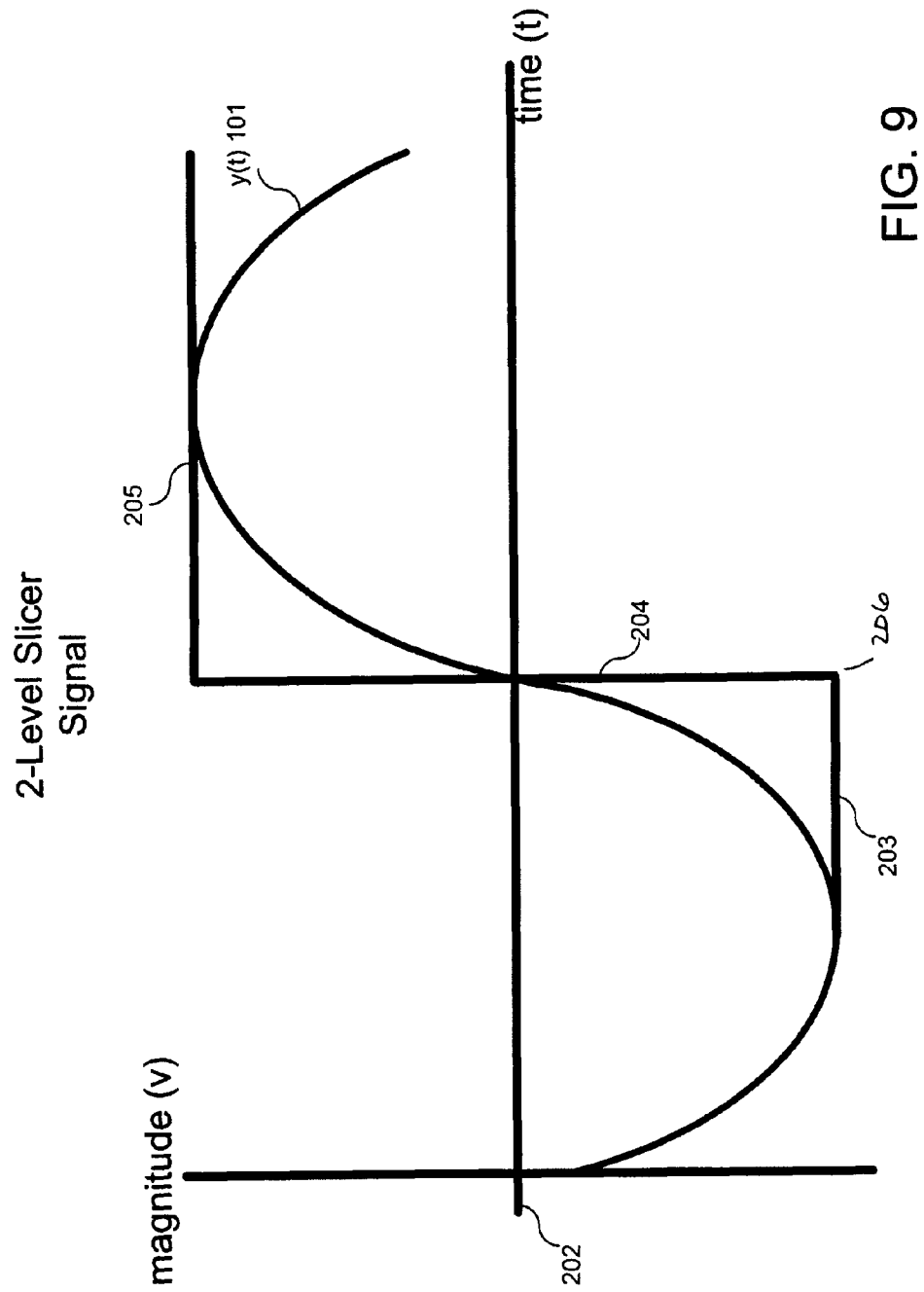
FIG. 9 illustrates a graph showing the magnitude of the input into a two-level slicer having one threshold level.

FIG. 9 illustrates a graph showing the magnitude of analog signals of a two-level slicer having one threshold level. The graph of FIG. 9 produced by a two-level slicer includes one threshold level 202. Analog signal y(t) 101 represents the input signal received by the two-level slicer, and the analog signal d(t) 206 represents the output signal produced by the two-level slicer. As analog signal y(t) 101 crosses above and below the threshold level 202, the slicer outputs analog signal d(t) 206 at one of the two output levels 203 and 205, respectively. In one embodiment, as analog signal y(t) 101 crosses threshold level 202 going down in magnitude, the two-level slicer outputs analog signal d(t) 206 at output level 203. As analog signal y(t) 101 crosses threshold level 202 going up in magnitude, the two-level slicer outputs analog signal d(t) 206 at output level 205, and has a transition slope 204. Unlike the multilevel slicer that equalizes all levels independently, the two-level slicer equalizes all levels dependently. Upon equalizing larger pulses that go from a first value, (e.g., output level 203), to a second value, (e.g., output level 205), the remaining smaller pulses with threshold levels in between the magnitude of values 203 and 205 but not shown in FIG. 9 can be corrected by the LMS.

Figure 10A:
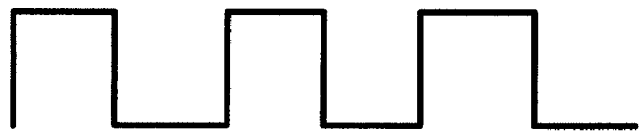
FIG. 10A illustrates a graph of a two-level signal without jitter and jagged edges.
Figure 10A:
Figure 10B:
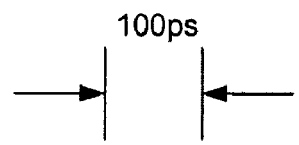
FIG. 10B illustrates an eye diagram of the two-level signal without jitter and jagged edges of FIG. 10A.
Figure 10B:

FIG. 10A illustrates a graph of a two-level signal without jitter and jagged edges. The two-level signal of FIG. 10A is a 10 Gb/s signal with a minimum pulse width of 100 ps. By taking all of the data pulses and putting them on top of each other (e.g., placing the data pulses so that every edge falls on top of each other), the resulting graph is an eye diagram. Eye diagrams are used to visualize how the waveforms used to send multiple bits of data could potentially lead to errors in the interpretation of those bits. This is due to intersymbol interference. Eye diagrams can be used to determine when to sample the analog pulse to generate corresponding digital signals for reconstructing the analog signal in the digital domain. An eye diagram shows the sampling period and the transition period between sampling periods. FIG. 10B illustrates the eye diagram of the two-level signal without jitter and/or jagged edges of FIG. 10A. In the present example, using 10 Gb/s signal, assuming the 2-level signal does not have any jitter nor jagged edges from a multilevel slicer, the sampling period may be the minimum pulse width of 100 ps.

Figure 10C:
FIG. 10C illustrates a graph of a two-level signal with jitter and jagged edges.
Figure 10D:
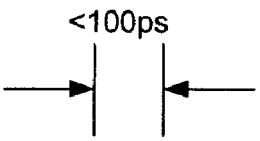
FIG. 10D illustrates an eye diagram of the two-level signal with jitter and jagged edges of FIG. 10C.
Figure 10D:

FIG. 10C illustrates a graph of a two-level signal with jitter and jagged edges. The two-level signal of FIG. 10C is also 10 Gb/s signal with a minimum pulse width of 100 ps, however, this signal includes jitter and jagged edges. FIG. 10D illustrates the eye diagram of the two-level signal with jitter and jagged edges of FIG. 10C. In the present example, using 10 Gb/s signal, assuming the 2-level signal does have jitter and/or jagged edges from a multilevel slicer, the sampling period may be less than the minimum pulse width of 100 ps.

Figure 8:
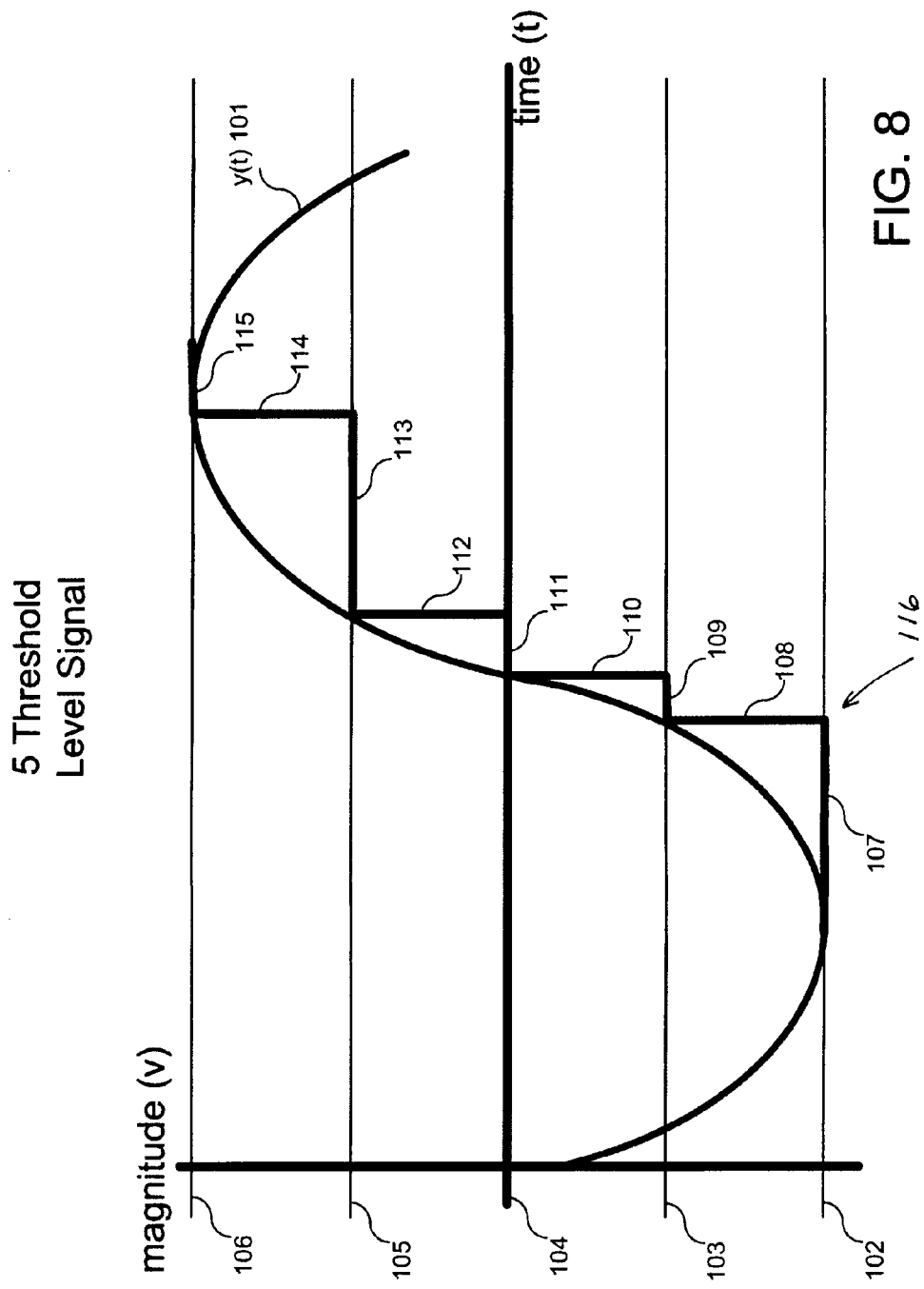
FIG. 8 illustrates a graph showing the magnitude of the input into a conventional multilevel slicer having five threshold levels.

Having described and illustrated the problem with jitter as well as the problem of having jagged edges, it should be noted that due to the jagged edges introduced by the multilevel slicer, as described with respect to FIG. 8, the eye diagram closes for a multilevel signal having jitter.

In one embodiment, by employing a two-level slicer instead of a multilevel slicer, the two-level slicer does not introduce jagged edges like the multilevel slicer. As a result, the calculated error signal e(t), derived from subtracting the input from the output of the two-level slicer, may not have narrow pulses like the multilevel slicer, resulting in the correct energy in the sliced signal. Furthermore, the analog error signal having non-narrow pulses and correct energies permits the LMS machine to converge, which may improve the overall performance of the system.

A two-level slicer includes a much simpler circuit than a multilevel slicer, such as the five threshold level slicer described above. Furthermore, the two-level slicer as described herein may function with a multilevel signal having PAM up to 16 PAM and higher.

Note that in one embodiment, the 2-level and multi-level slicers are clockless (i.e., they do not require a clock signal). Because the embodiments do not require a clock signal, there is no complex timing involved. Furthermore, it should be noted that eventually a clock signal may be generated, but the clock signal may be extracted from a healthy signal, a signal with a higher signal-to-noise ratio, as opposed to a weak signal that includes a lot of noise. For example, the clock may be generated after removing the impairments, such as near end and far end crosstalk echo and ISI. Furthermore, because this processing is performed in the analog domain before converting the analog signal into a digital signal there may be no quantization noise, in turn deteriorated further by clock jitter (e.g., introduced by A/D converter 18), reducing the overall signal-to-noise ratio. Because A/D converter 18 receives analog signal having a lower signal-to-noise ratio, A/D converter 18 typically requires only 7 ENOB for subsequent processing, as opposed to the 10 or 11 ENOB required in the prior art, as shown and described with respect to FIG. 1, for processing the same input signal.

Thus, improved front end processing has been described for a data carrying signal received over a twisted pair. Many of the impairments often removed with digital signal processing are removed in the analog domain. This significantly reduces the performance required of the A/D converter, as described above, and thereby provides a more readily realizable and better performing circuit.

Although present embodiments have been described with reference to specific embodiments, it will be evident that various modifications and changes may be made to these embodiments without departing from the broader spirit and scope of the present embodiments. Accordingly, the specification and drawings are to be regarded in an illustrative rather than a restrictive sense.

What is claimed is:

1. An apparatus, comprising:
    an analog equalizer (AEQ) for receiving a multi-level analog signal comprising three or more levels and for generating an AEQ output signal;
    a least mean square (LMS) machine, coupled to the AEQ, for receiving an analog error signal and for training adaptive tap weights of the AEQ;
    a two-level analog slicer, coupled to the AEQ, comprising one threshold level and for generating a two-level analog signal in response to the multi-level analog signal; and
    a subtractor, coupled to the two-level analog slicer and the LMS, for subtracting the AEQ output signal from the two-level analog signal to generate the analog error signal.

2. The apparatus of claim 1, wherein the multi-level analog signal comprises a pulse amplitude modulation (AM) of 4 or more levels.

3. The apparatus of claim 1, wherein the two-level analog slicer permits processing of the multi-level analog signal having a pulse amplitude modulation (PAM) of up to 16 levels.

4. The apparatus of claim 1, wherein the multi-level analog signal comprises a 16 level pulse amplitude modulation (PAM) signal.

5. The apparatus of claim 1, wherein the two-level analog slicer is to operate without a clock signal.

6. A circuit, comprising:
    an analog equalizer (AEQ) for receiving an analog signal over a twisted pair and for generating an AEQ output signal comprising a multi-level analog signal comprising three or more levels;
    a least mean square (LMS) machine, coupled to the AEQ, for receiving an analog error signal and for training adaptive tap weights of the AEQ;
    a two-level analog slicer, coupled to the AEQ, comprising one threshold level and for generating a two-level analog signal in response to the multi-level analog signal; and
    a subtractor, coupled to the two-level analog slicer and the LMS, for subtracting the AEQ output signal from the two-level analog error signal.

7. The circuit of claim 6, further comprising means for converging the least mean square (LMS) of an adaptive equalizer.

8. The circuit of claim 6, further comprising means for increasing a sampling period of the multi-level analog signal.

9. The circuit of claim 6, further comprising means for reducing the transition time between sampling periods of the multi-level analog signal.

10. A method, comprising:
    receiving, by an analog equalizer (AEQ), a multi-level analog signal comprising three or more levels;
    training adaptive tap weights of the AEQ by using a least mean square (LMS) coupled to the AEQ, the LMS receives an analog error signal;
    slicing the multi-level analog signal using a two-level analog slicer for generating a two-level analog signal in response to the multi-level analog signal; and
    subtracting an output of the AEQ from the two-level analog signal to generate the analog error signal.

11. The method of claim 10, further comprising:
delaying the received multi-level analog signal in a plurality of serial analog stages (n);
further delaying the multi-level analog signal tapped from stage n;
combining the further delayed signal from stage n with an analog error signal e(t) to provide an analog weighting function $W_n$, wherein the combining of the delayed signal from stage n with $W_n$ results in a plurality of signals $X_n W_n$;
summing the plurality of signals $X_n W_n$, wherein said slicing comprises slicing the multi-level signal resulting from the summing of the plurality of signals $X_n W_n$ to generate the analog error signal e(t); and
combining the delayed signal from stage n with $W_n$.

12. The method defined in claim 11 further comprising:
summing delayed version of the multi-level analog signal; and
slicing the summation of delayed signals using the two-level analog slicer.

13. The method of claim 11, further comprising equalizing the multi-level analog signal using the analog error signal.

14. The method of claim 11, wherein generation of $W_n$ includes integrating the combined signal from the first combining operation.

15. The method of claim 11, wherein the multi-level analog signal resulting from the summing of the plurality of signals $X_n W_n$ is input into a digital signal processor (DSP) for additional signal processing via an analog to digital converter (A/D converter).

16. The method of claim 10, wherein the two-level analog slicer operates without a clock signal.

17. The method of claim 10, wherein the multi-level analog signal comprises a 16 level pulse amplitude modulation (PAM) signal.

18. The method of claim 10, wherein the slicing occurs at a rate corresponding to a data rate at which data is transmitted over the received multi-level signal.

* * * * *